US007181025B2

(12) United States Patent
Kolano et al.

(10) Patent No.: US 7,181,025 B2
(45) Date of Patent: Feb. 20, 2007

(54) ULTRASOUND BASED PARAMETRIC LOUDSPEAKER SYSTEM

(75) Inventors: Guido Kolano, Salach (DE); Klaus Linhard, Schelklingen (DE)

(73) Assignee: DaimlerChrysler AG, Stuttgart (DE)

( * ) Notice: Subject to any disclaimer, the term of this patent is extended or adjusted under 35 U.S.C. 154(b) by 775 days.

(21) Appl. No.: 10/118,630

(22) Filed: Apr. 8, 2002

(65) Prior Publication Data

US 2002/0172375 A1 Nov. 21, 2002

(30) Foreign Application Priority Data

Apr. 7, 2001 (DE) ................................ 101 17 529

(51) Int. Cl.
*G05B 15/00* (2006.01)

(52) U.S. Cl. ........................................ 381/77; 181/184

(58) Field of Classification Search .................. 381/75, 381/77, 79, 111, 116, 150, 337, 373; 181/184, 181/142, 175, 177; 367/137
See application file for complete search history.

(56) References Cited

U.S. PATENT DOCUMENTS

| | | | | |
|---|---|---|---|---|
| 1,951,669 A | 3/1934 | Ramsey | | 181/0.5 |
| 2,371,373 A * | 3/1945 | Badmaieff | | 369/129 |
| 3,418,564 A * | 12/1968 | Nelson | | 324/310 |
| 4,823,908 A | 4/1989 | Tanaka et al. | | |
| 5,917,776 A * | 6/1999 | Foreman | | 367/93 |
| 6,359,990 B1 * | 3/2002 | Norris | | 381/77 |
| 6,606,389 B1 * | 8/2003 | Selfridge et al. | | 381/111 |
| 6,807,281 B1 * | 10/2004 | Sasaki et al. | | 381/111 |
| 6,850,623 B1 * | 2/2005 | Norris et al. | | 381/97 |

FOREIGN PATENT DOCUMENTS

DE 3929243 * 3/1991 ................. 367/137

OTHER PUBLICATIONS

E. Stadler: Modulationsverfahren, 6. Aufl., Vogel Buchverlag, Würzburg, 1990.

* cited by examiner

*Primary Examiner*—Vivian Chin
*Assistant Examiner*—Lun-See Lao
(74) *Attorney, Agent, or Firm*—Akerman & Senterfitt; Stephan Pendorf; Yonghong Chen

(57) ABSTRACT

A parametric loudspeaker system is described which is based upon the FM-modulation of an ultrasound carrier. Known systems work with AM-modulation. The FM-modulation produces a good matching to the resonant transducer such as the conventionally employed piezo-ceramic transducers. The resonance slope of the transducers is used for FM/AM-conversion. This FM-resonance principle can advantageously be employed in a multi-path loudspeaker system, in which the transducer works in the optimal resonance range in each of the paths. With the conventional AM-modulation this is not possible. The FM-resonance principle can also be used in resonance-free or resonance-poor transducers, such as for example electrostatic transducers.

29 Claims, 9 Drawing Sheets

ULTRASOUND BASED PARAMETRIC LOUDSPEAKER SYSTEM

BACKGROUND OF THE INVENTION

1. Field of the Invention

The invention concerns a process for controlling a parametric loudspeaker system, comprised of (a) one or more transducer elements for ultrasound, which can be driven to produce an AM-signal, which during propagation in a gaseous medium produces an audible signal by self demodulation, (b) one or more amplifiers associated with these transducer elements, and (c) one or more modulators associated therewith, which receive an input signal from a signal source, and a device suitable for carrying out the process.

2. Description of the Related Art

An emission of directional sound waves requires a sound transducer with a geometric size in the range of multiple wavelengths. In place of a single transducer it is also possible to employ multiple transducers in order to produce the large geometric measurement. An arrangement of multiple transducers is referred to as an array. The individual transducers can additionally have an upstream signal processor in order to increase the directionality of the array.

In order to produce a strong directionality with small transducer size a modulation technique can be employed in order to couple a low frequency useful signal (audio signal) with a high frequency carrier signal. It is the wavelength of the higher frequency carrier signal that is primarily determinative of directionality. A parameter of the carrier signal is controlled by the useful signal. From this, the term parametric transducer or parametric array is derived.

The present invention is concerned with a parametric loudspeaker which employs ultrasound as the carrier signal. The basic physical experiments can be traced back to the German physicist Helmholtz in the $19^{th}$ century. A useful loudspeaker system is described by Yoneyama, et al.: "The Audio Spotlight: An Application of Nonlinear Interaction of Sound Waves to a new Type of Loudspeaker Design"; J. Acoust. Soc. Am., Vol. 73, pp. 1532–1536. Reports thereof were made in the subsequent years in further publications of Berktay, Blackstock, Pompei and others.

If ultrasound is emitted at very high levels, the air becomes a nonlinear medium, which causes a self-demodulation of the modulated ultrasound on the basis of the nonlinearity. Therewith, the modulated signal becomes audible. The ultrasound itself remains inaudible.

From WO 01/08449 A1 a process for reproducing audio waves using ultrasound loudspeakers is known, wherein the audio signal to be reproduced is coupled with a carrier signal in the ultrasound frequency range by a side-band amplitude modulation. Therein the modulation is either realized as conventional two side band AM or as one side band AM, wherein the carrier is suppressed by approximately 12 dB for further functional optimization. In particular in the employment of transducers with strong nonlinear frequency paths it is herein advantageous to achieve a linearization of the frequency path, in order to balance out frequency dependent amplitude defects.

SUMMARY OF THE INVENTION

It is the task of the invention to find a new process for controlling a parametric loudspeaker system, comprised of (a) one or more transducer elements for ultrasound, which can be driven to produce an AM-signal, which during propagation in a gaseous medium produces an audible signal by self demodulation, (b) one or more amplifiers associated with these transducer elements, and (c) one or more modulators associated therewith, which receive an input signal from a signal source, and a device suitable for carrying out the process.

In particularly advantageous manner, in the inventive process and the inventive device for controlling a parametric loudspeaker system, comprised of one or more transducer elements for ultrasound, the transducer elements are controlled in the area of their resonant characteristic lines with an FM modulated signal. The transducer elements are capable thereby of producing a AM-signal, which upon propagation or spreading out in a gaseous medium produce an audible signal by self demodulation. By the controlling or driving of the parametric loudspeaker system by means of an FM modulated signal there results a good possibility of adapting or conforming the modulated signal to particularly resonant transducers, in that it can be ensured, that these work in their optimal resonance range.

BRIEF DESCRIPTION OF THE DRAWINGS

On the basis of the illustrative embodiments and with the help of the figures, the inventive subject matter will be described in greater detail below.

DETAILED DESCRIPTION OF THE INVENTION

As in the systems for modulation of an ultrasound signal for parametric loudspeakers as known in the state of the art, amplitude modulation is proposed (AM-modulation). Therein the conventional 2 side-band AM-modulation is employed (double side band AM, DSB-AM). Herein the useful signal $a_N(t)$ and the carrier signal $A_T\cos(2\pi f_T t)$ of the sender signal s(t) for DSB-AM are expressed by:

$$s(t)=A_T\cos(2\pi f_T t)(1+ma_N(t)) \quad \text{Equation 1}$$

wherein m represents the degree of modulation. It is in the interval 0<m<1. The amplitude of $a_N(t)$ is maximally 1. t represents the time, and $f_T$ represents the frequency of the carrier signal.

If H(f) represents the transmission function of an ultrasound transducer, then there is valid in the frequency range for the output signal of the ultrasound transducer $Y_{US}(f)$ $$Y_{us}(f) = H(f)\cdot\left[\frac{m}{2}\cdot A_N(f_T - {}'f) + \frac{A_T}{2}\delta(f - f_T) + \frac{m}{2}\cdot A_N(f_T + f)\right] \quad \text{Equation 2}$$

The two side bands result, $A_N(f_T-f)$ and $A_N(f_T+f)$, to the left and to the right beside the carrier $$\frac{A_T}{2}\delta(f - f_T).$$

Figure 1:
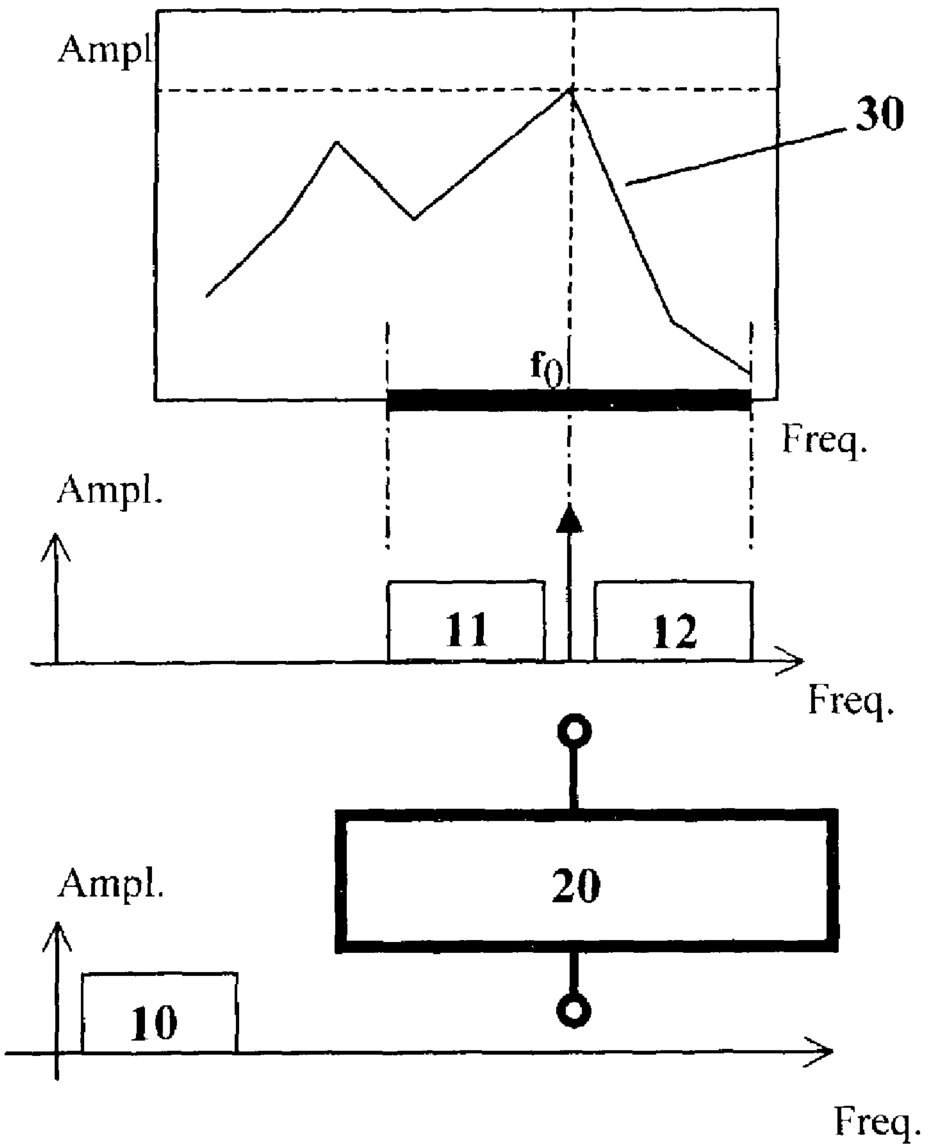
FIG. 1 shows schematically the process for amplitude demodulation as known from the state of the art.

FIG. 1 schematically shows the original audio signal 10 in the frequency range and the AM-modulator 20 which places the audio signal in the frequency range to the right 11 and to the left 12 beside the carrier frequency. The exemplary transmission function 30 of an ultrasound transducer is likewise shown. The ultrasound transducers have a maximal transmission at a frequency $f_0$. The carrier frequency is set at $f_0$. the two side bands are emitted according to the transmission function of the transducer.

Figure 2:
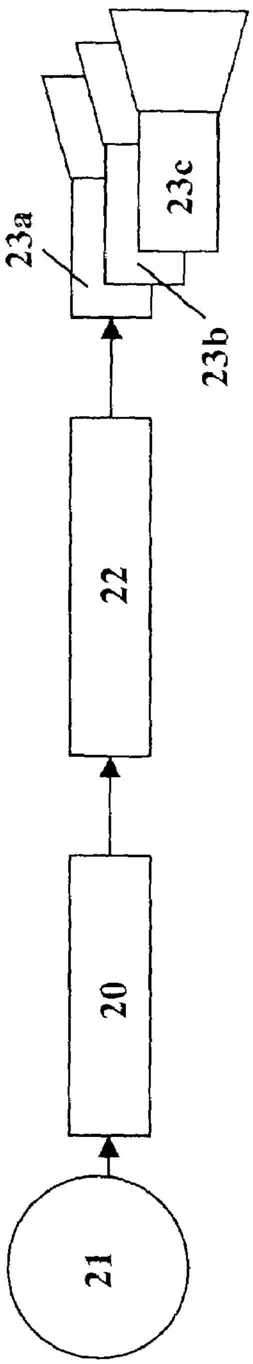
FIG. 2 shows a block circuit diagram for a parametric loudspeaker.

FIG. 2 shows a block diagram for a parametric loudspeaker. The audio signal source 21 supplies the AM-modulator 20, which prepares the signal for an amplifier 22. Connected to the amplifier are one or more transducers 23*a–c*. In order to increase the output of the parametric loudspeaker or to achieve an increased directionality multiple transducers 23*a–c* can be employed for a loudspeaker system. For increasing the output power as a rule multiple transducers 23*a–c* are connected in parallel. Such an arrangement of multiple transducers is also referred to as array.

Figure 3:
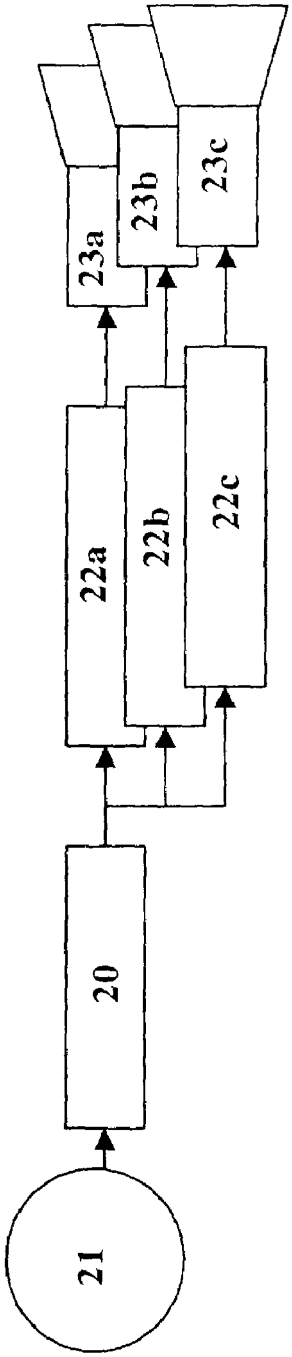
FIG. 3 shows a system in which multiple amplifiers are employed.

A more common arrangement results when multiple amplifiers 22*a–c* are employed and when one or more transducers 23*a–c* are connected to each amplifier 22*a–c*. FIG. 3 shows one such system, in which multiple amplifiers 22*a–c* are employed. The common modulator 20 drives multiple amplifiers 22*a–c* to which one or more transducers 22*a–c* are connected.

In the case of employment of multiple transducers according to FIGS. 2 and 3 there results, in addition, an array directionality, that is, the directionality of the individual transducer is superimposed with the directionality produced by the array, so that overall a stronger directionality results. The consideration of the directional effect is primarily based upon the ultrasound which is emitted by the transducers. The resulting directionality for the audible audio sound can be deduced from the consultation of a model. Therein the process of the self demodulation by multiple virtual loudspeakers is represented, which are arranged in a three dimensional air column which is excited by ultrasound. The superimposition of these virtual sources produce the desired audio directionality.

The production of an audible sound excitation is based upon the self demodulation at high sound wave pressures. A generating curve or envelope curve must be present, which can then be made audible again by the spreading out in the non-linear medium. This is similar to producing the generating curve with the desired AM-modulation.

In a particularly preferred manner the present invention employs frequency modulation (FM) as the modulation process. For this reason the generating curve of the signal to be emitted by the transducers must be produced in a different mode and manner, since the physical principle of the self-demodulation known in the state of the art is to be taken advantage of.

In the AM-modulation with resonant transducers as known in the state of the art, such as for example conventional piezo transducers, the carrier (conventionally at the maximum of the transducer function) and the two side bands are transformed with quite different transmission values of the transducer function. That means, the carrier and the deep audio frequencies are more strongly transmitted than the higher audio frequencies which lie far to the right or far to the left in the two side bands. This results therein, that the degree of modulation changes, in the manner, that high audio frequencies are less modulated and thus less strongly produced. Depending upon desired characteristics, corrections of the hereby produced audio signal or the modulated signal may be necessary. The FM-principle has the primary advantage, that this frequency dependency attributable to the resonance slope does not occur. The resonance slope is necessary in the FM-principle (and is not an interference factor). The subject matter of the invention will be described in detail in the following on the basis of an exemplary ultrasound transducer. Herein it is presumed, that the ultrasound transducers are resonant transducers.

The energy emitted by these ultrasound transducers depends very strongly upon the employed frequency. There are one or more frequencies, for which the emission assumes relatively high values (resonance points). In the vicinity of these resonance points the emitted power is more or less strongly suppressed. This relationship can be used for the production of audible sounds.

Examples of resonantive ultrasound transducers include transducers such as those made of piezo-ceramic.

Consider the case that H(f) represents the transmission function of an ultrasound-transducer and $f_0$ represents a resonance point. Then the transmission function has a (at least local) maximum at $f_0$. The amplitude $Y_{US}$ of an ultrasound signal of frequency f and the electric input amplitude $X_{US}$ is then determined by $$Y_{US}(f)=H(f)\cdot X_{US} \quad \text{Equation 3}$$

with $X_{US}=1$ and the useful signal level $a_N$ whereupon one obtains $$Y_{US}(f_r,a_n)=H(f_r+\Delta f\cdot a_n) \quad \text{Equation 4}$$

wherein Δf provides the frequency stroke in dependence upon the input level and $f_T$ is the frequency of the ultrasound carrier signal. If one selects for $f_T$ and Δf so that the following is valid:

$$f_T+\Delta\cdot a_n \geqq f0 \quad \text{Equation 5}$$

or $$f_T+\Delta f\cdot a_n \leqq f0 \quad \text{Equation 6}$$

and if besides this in the thereby covered or swept over interval the transmission function H(f) is monotone, then one can produce with frequency modulation an envelope curve, which corresponds to the envelope curve with amplitude modulation.

In the case corresponding to Equation 5, there applies for a change in the useful amplitudes $a_N$:

$$a_{n1} > a_{n2} \Rightarrow Y_{US}(f_T + \Delta f \cdot a_{n1}) < Y_{US}(f_T + Xf \cdot a_{n2}) \quad \text{Equation 7}$$

and in the case of Equation 6:

$$a_{n1} > a_{n2} \Rightarrow Y_{US}(f_T + \Delta f \cdot a_{n1}) > Y_{US}(f_T + Xf \cdot a_{n2}) \quad \text{Equation 8}$$

By the separation of the carrier function of the ultrasound transducer into two monotone ranges left and right of a resonance frequency, an envelope curve can be produced selectively in accordance with the given equation which changes in phase with the useful signal, or in counter-phase. Both cases can be used interchangeably for the production of amplitude modulated ultrasound waves.

Figure 4:
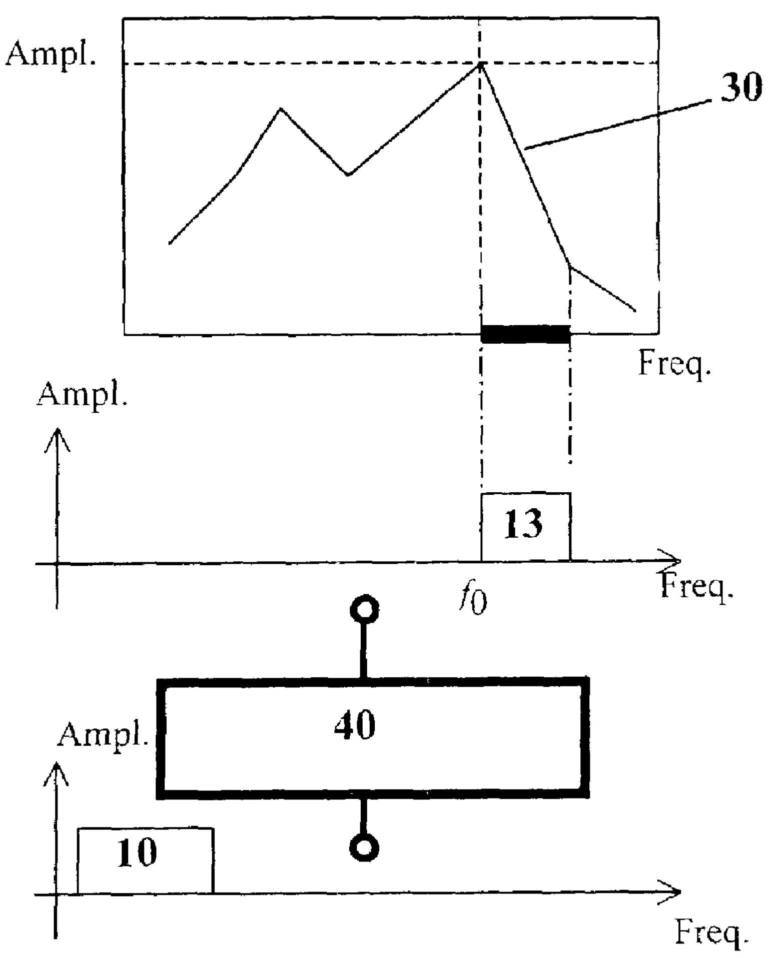
FIG. 4 shows schematically the construction of a parametric loudspeaker with FM-modulation.

FIG. 4 shows schematically the construction of a parametric loudspeaker system with FM-modulation in connection with a resonant transducer. The FM-modulator 40 is supplied with the audio signal 10. The FM-modulator 40 converts the voltage of the audio signal 10 into a frequency 13. The original frequency bandwidth of the audio signal is translated to another frequency bandwidth and set in the frequency position by the frequency $f_0$.

In theory, the band breadth requirement of an FM-signal is unending. In practice, compromises are made in order to constrain the band breadth requirement accordingly. In the so-called broad band FM, much band breadth is used in relationship to the original band breadth of the audio signal from the FM-signal. In the so-called narrow band FM, the band breadth requirement of the EN-signal is in the size range of the audio signal. A too-narrow FM-band breadth can result in a corresponding harmonic distortion or coefficient of non-linear distortion. An experimental procedure is employed here.

Figure 5:
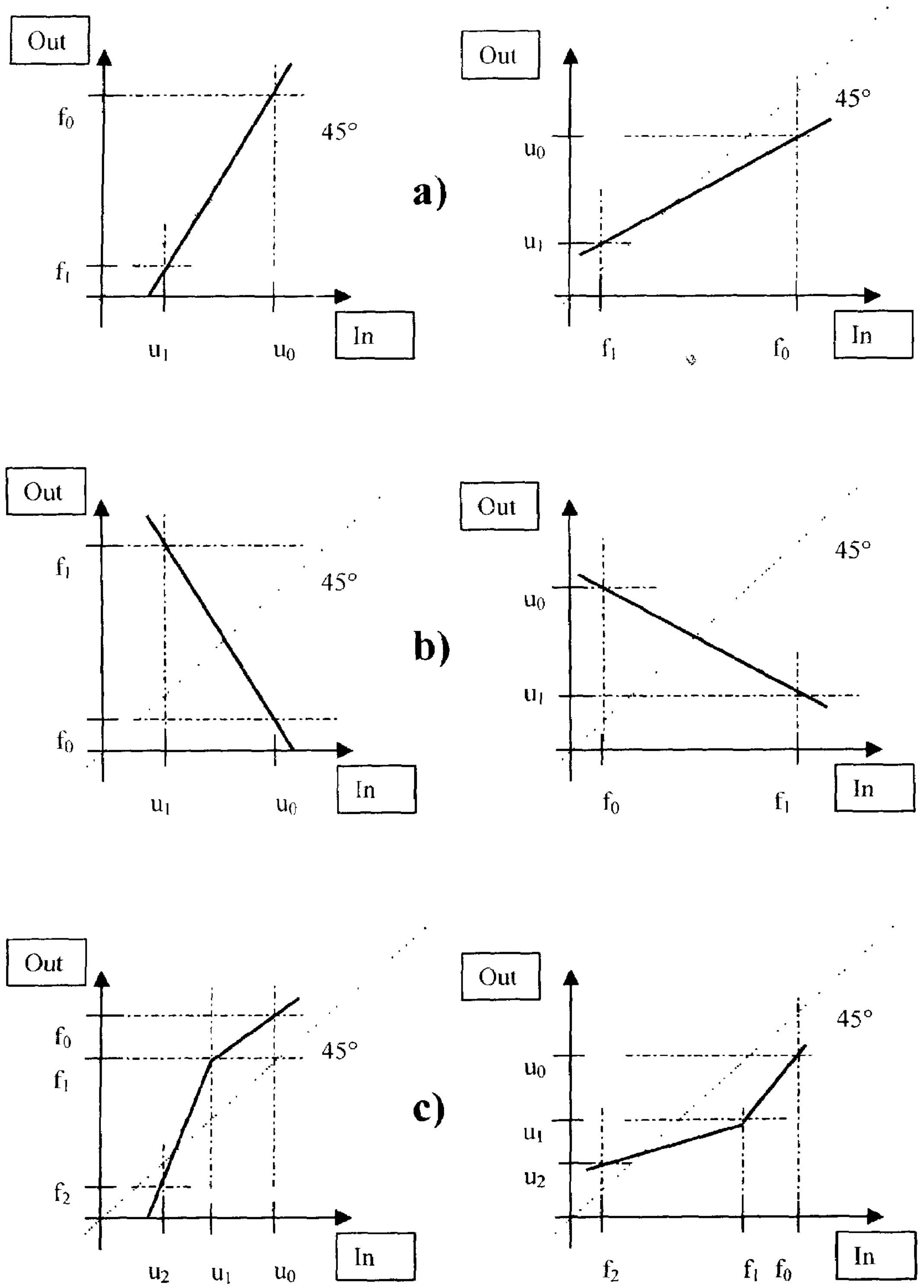
FIGS. 5*a–c* show by means of three examples the cooperation of the characteristic lines of the modulator and the characteristic lines of the transducer.

In order to improve the understandability of the following examples the FM-modulator 40 is constructed as a modulator-characteristic line, which translates an input voltage into a frequency. The transducer (for example: ultrasound transducer on the basis of a piezo-ceramic) can be designed according to the transducer characteristic line, which translates a frequency into a voltage. In this sense FIG. 5 shows in three examples respectively the cooperation of the modulator characteristic lines and the transducer characteristic lines. At this point it should be noted, that in the following discussion for convenience it is referred to that the transducer converts a frequency supplied to it into a voltage. For the person working in this art it is however understood, that this is simply a simplification for explanatory purposes and of course a frequency-voltage conversion at the transducer does not occur, rather the frequency is converted into a sound pressure. The sound pressure is then measurable in a measuring microphone.

The following examples for FM-modulation described on the basis of the simplified representation for the case, that a constant voltage is employed as input signal, which is set within an interval. If the lower and the upper value of the voltage interval is employed, there results the FM-modulation of a specific frequency interval. If however an other voltage is utilized, such as for example an audio signal, so there results following the FM-modulation, as already described, theoretically an unlimited band breadth of the FM-signal.

In practice, as the minimal size of the frequency interval, that interval can be selected, which corresponds to the smallest and the largest amplitude of the input signal. The frequency interval should correspond to at least 2 times the simple band breadth of the input signal. If the frequency interval is selected to be larger, then a higher transmission quality can be achieved. Thereby it must be observed, that the resonance slope of the transducer associated with the frequency interval must be of sufficient size.

In order to maintain a defined frequency interval the FM-signal can be limited using a band pass filter before it is supplied to the transducer. A certain degree of band pass filtering is exercised by the transducer itself. As has ready been discussed in connection therewith, an experimental process is utilized for the selection of the band breadth.

The case shown, in FIG. 5*a*) begins with or presumes a monotone transducer characteristic line-part left of the resonance frequency $f_0$. For this, in the ideal case a modulator is necessary with a mirrored transducer characteristic line. The mirror axis is 45° diagonal in the characteristic line field. In the ideal case there results by the cooperation of the transducer characteristic line with the (mirrored) modulator-characteristic line a 1:1 translation of the audio input voltage in an envelope curve—output voltage in the transducer. The voltage $u_0$ is again translated into the voltage $u_0$ and the voltage $u_1$ is again translated to the voltage $u_1$.

The voltage translation with the relationship 1:1 was presumed herein for simplification. In practical applications voltage values of for example: $u_1$, $u_2$, $u_3$, $u_4$, . . . are uniquely or single-valued translated to the values $v \cdot u_1$, $v \cdot u_2$, $v \cdot u_3$, $v \cdot u_4$, . . . . Therein v represents the amplification factor.

FIG. 5*b*) shows the transducer characteristic line and the thereto ideal modulator characteristic line for a transducer with a monotone characteristic line-part right of the resonance frequency. The same considerations apply as in the case a).

FIG. 5*c*) shows an example of an ideal matched modulator for the case that the transducer-characteristic line is comprised of 2 straight segments. There results then the corresponding ideal modulator characteristic line by mirroring at the 45° axis, corresponding to examples a) and b).

In accordance with examples a) through c), by mirroring, appropriate or corresponding ideal modulator-characteristic lines can be derived for the transducers with characteristic lines comprised of many straight segments or, in the more common case, comprised of multiple monotone curve segments.

In FIG. 5 the smallest occurring voltage at the transducer-characteristic line is referenced with $u_1$ and the cases a) and b) and with $u_2$ in the case c). For these voltages it applies that they are selected to be value zero. For the case that these voltages are selected to be zero there results a modulation degree of 100%, that is, the produced envelope curve moves in a voltage range from 0 up to maximal value $u_0$. For the examples in FIG. 5 with an assigned minimal value of larger than zero the modulation degree <100%. The degree of modulation can be calculated:

$$m = 1 - \frac{\text{smallest} - \text{amplitude} - \text{value}}{\text{largest} - \text{amplitude} - \text{value}} \quad \text{Equation 9}$$

The degree of modulation is adjustable by the selection of the voltage range in the transducer. In general, the conventionally employed FM-modulator is comprised of a characteristic field of monotonous curve segments which uniquely associate an input signal with an output voltage.

Figure 6:
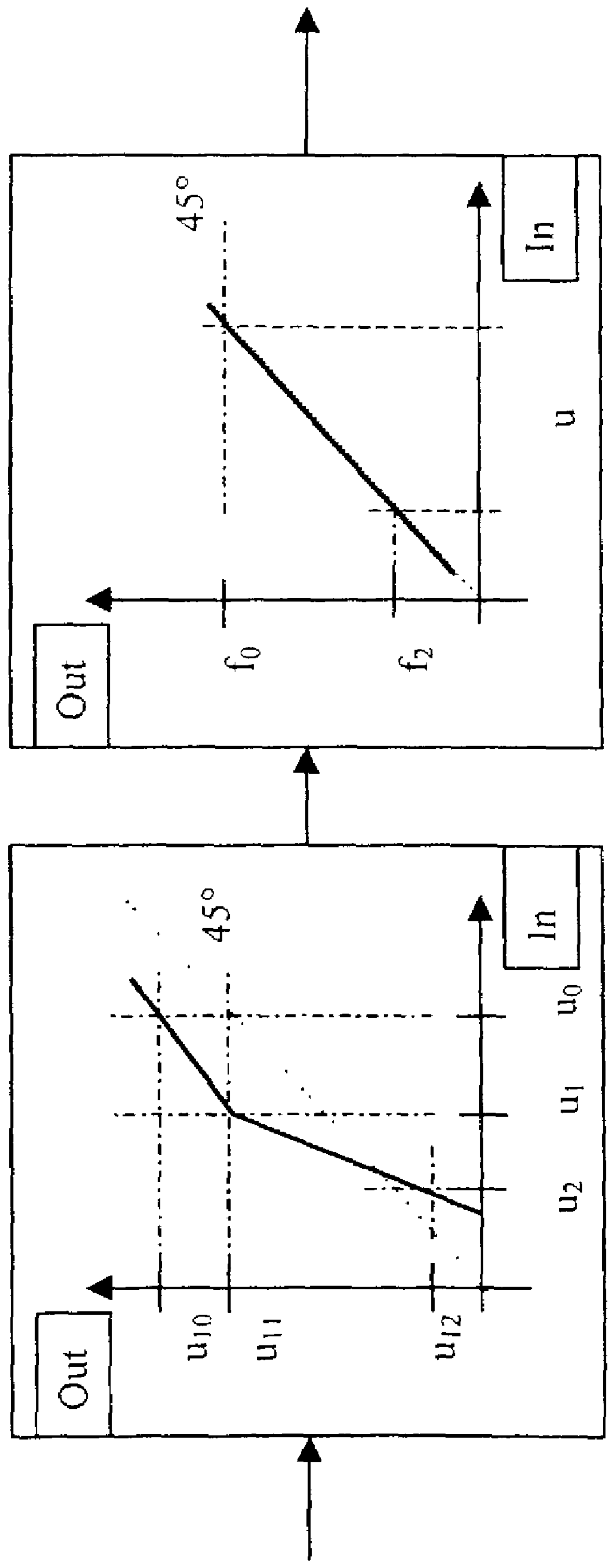
FIG. 6 shows an FM-modulator which is comprised of two partial systems.

In practice, this FM-modulator can be constructed for example of 2 partial systems. One system with a correction characteristic line which "equalizes" the characteristic line of the transducer and one system with the actual FM-modulator. FIG. 6 shows an FM-modulator which is comprised of 2 partial systems. One first characteristic line system which translates a voltage at the input into a voltage at the output and as second system a conventional FM-modulator. If situation c) from FIG. 5 is used as an example, so then the correction of the transducer characteristic line is the voltage correction line of the first system. There are produced as intermediate values the voltages $u_{10}$, $U_{11}$, $U_{12}$, etc. The subsequent conventional FM-modulator then only carries out the "linear" voltage/frequency translation.

In comparison to the process for frequency linearization with AM-modulated control of the ultrasound-transducer as known from the state of the art from WO 01/08449, in accordance with the inventive process no equalization or balancing of the frequency dependent transducer characteristic line takes place. To the contrary, the inventive process is based in advantageous manner on the utilization of the increasing or, as the case may be, receding slope of the resonance characteristic line of the transducer. In the framework of the invention there occurs one singular linearization, eventually subdivided to individual partial segments of the transducer-characteristic line, in the framework of a straightening under maintenance of the rise or as the case may be fall of the respective used slope. Precisely by the utilization of the rising or as the case may be falling course of the characteristic line slope of the transducer, an audible demodulated signal can be produced thereby in the propagation medium.

Figure 7:
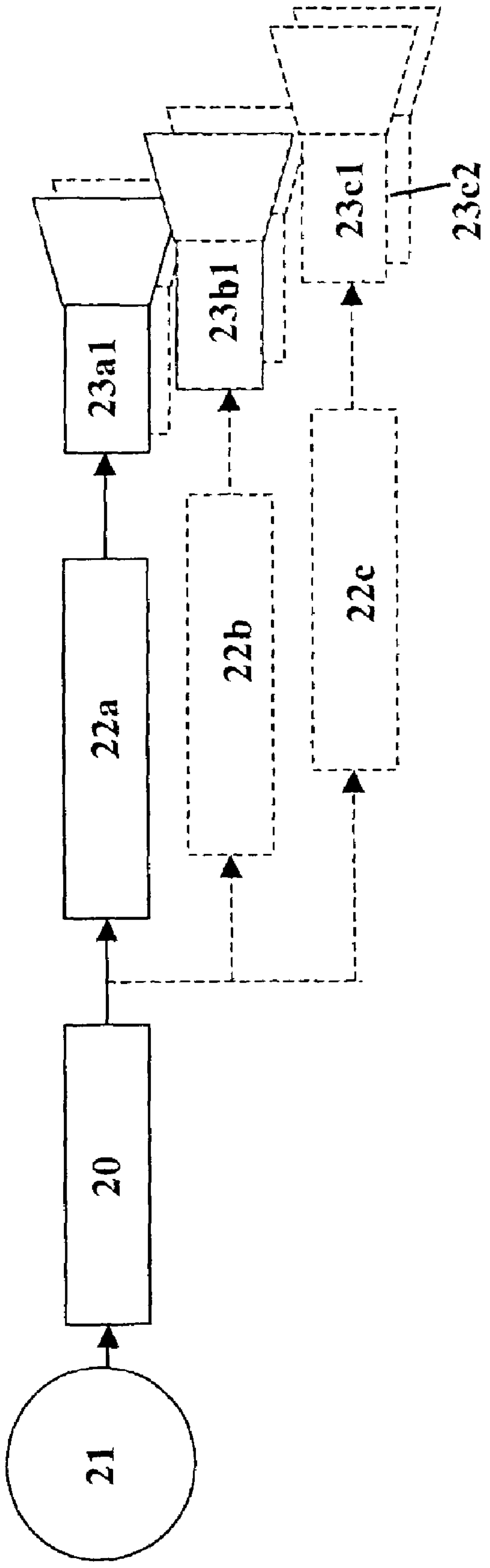
FIG. 7 shows a parametric loudspeaker system based on FM-modulation with resonant transducers.

A parametric loudspeaker system based upon FM-modulation with resonant transducers is shown in FIG. 7. An FM-modulator 20 supplied by a signal source 21 supplies in turn one or more amplifiers 22*a*, . . . , 22*c* of which each one drives individual or multiple transducers 23*a*1, . . . , 23*c*2.

Figure 8:
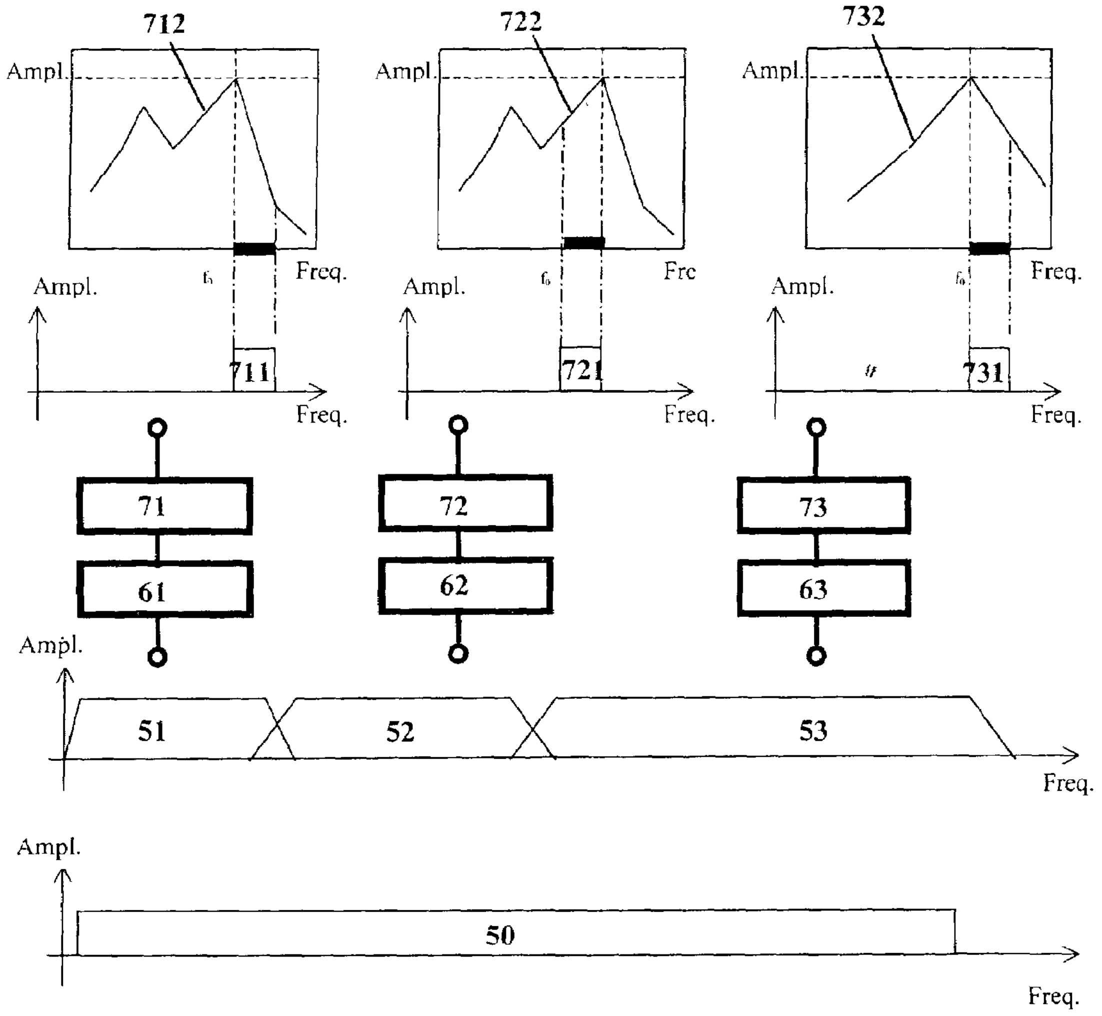
FIG. 8 shows a multi-path loudspeaker system on the basis of parametric loudspeakers.

In FIG. 8 a multi-path loudspeaker system is shown. The audio-signal 50 is divided by a frequency separation into multiple paths. For example, three paths can be arranged: for the deep frequencies 51, for the intermediate frequencies 52 and for the higher frequencies 53. The signals from each of these "paths" are supplied to an appropriate FM-modulator (61, 62 or 63), an amplifier stage (71, 72 or 73) and an associated transducer. For the individual paths different transducers with different transducer-characteristic lines (712, 722 or 732) can be employed; for example, for deep frequencies as a rule transducers with higher power are employed.

It is particularly advantageous that the multi-path system with FM-modulation can be designed or conformed in each of the paths to the resonator frequency $f_0$ of the respective transducers, corresponding to (71, 72 or 73), whereby a good efficiency results. The transducers thus operate under the best possible conditions. In addition, by the selection of a transducer type, it is possible for each path to optimally adapt the band breadth and output of the transducer to the signal of the respective signal path.

In advantageous manner the inventive multi-path system can be so designed, that via the employed frequency range a power or output conformance of the transducer results, in the manner, that the selection of the transducers of a group of transducers is determined or matched to the output required in this frequency band. It is further advantageous to optimize the respective directional effect of the loudspeaker system for each individual of the group of transducers, in that the selection of the individual transducers of a group of transducers occurs on the basis of the directionality of the individual transducer in the respective frequency band.

It is particularly advantageous for the inventive multi-path system, when for each of the individual groups of transducers the respective directionality of the loudspeaker system is optimized, in that the individual groups of transducers are arranged differently geometrically, depending in particular upon the frequency band of the input signal of the modulators associated therewith.

It has been found by experimentation, that for the production of deeper audio frequencies a larger air column must be brought into excitation (transducers on the outside in the array) than for the higher audio frequencies (transducers inside in the array). By the geometric arrangement a distribution of the transducers in a multi-path system therewith the optimization can be achieved in this respect.

Figure 9:
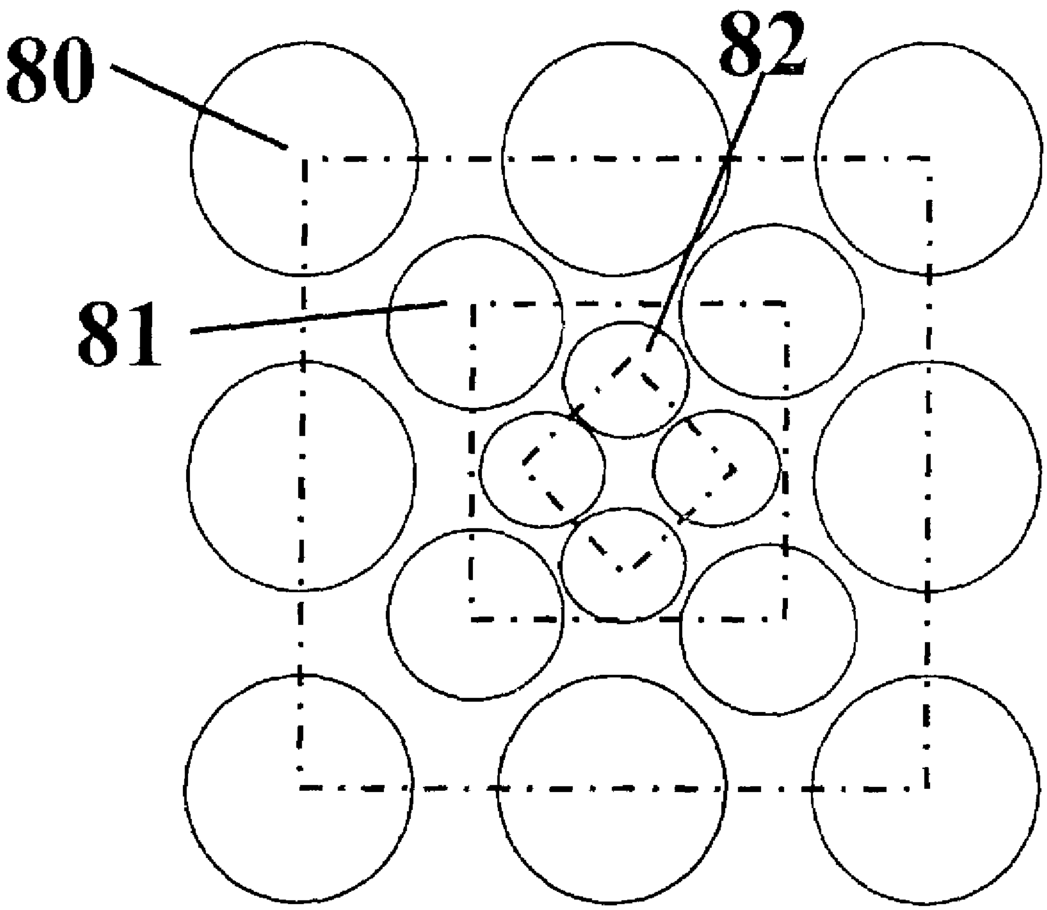
FIG. 9 shows an advantageous arrangement of the transducers within the multi-path loudspeaker system.

FIG. 9 shows a preferred illustrative embodiment wherein eight transducers are arranged in an outer square 80. The arrangement of the transducers in the shape of a square is here only by way of example. A further square 81 with four transducers occurs further inwardly and finally there occurs a diagonally arranged square 82 comprised of four transducers in the interior or the array. The overall arrangement produces a 3-path system. Preferably high power transducers are provided for the base at the outer square, then there follow further inwardly the transducers for the intermediate and finally in the center the transducers for the higher frequencies.

Generally, independent of the preferred arrangement shown in FIG. 9, an advantageous arrangement of transducer elements can be realized either in that the transducers are so arranged, that the transducers which are associated with the lower frequencies of the input signal are situated in the outer area of the arrangement and that the transducers which are associated with the higher frequencies of the input signal are situated in the inner area of the arrangement. In particular, it is herein conceivable that the transducers, which are associated with the high frequencies of the input signal, are positioned close to each other, and that the transducers, which are associated with the lower frequencies of the input signal, are arranged less tightly (more spread out).

Conventional transducers of piezo-ceramic exhibit, as described above, a resonant characteristic line (frequency response curve). For this, the FM-modulation in the described manner is ideally suited. Electrostatic transducers are as a rule broader in bandwidth, that is, they are only weakly spread out or exhibit no resonance points. Nevertheless the described FM-modulation can be utilized, when transducers of this type are driven in a resonance cycle. A resonance point can for example be produced in an RLC-network. The transducers themselves exhibit, as a rule, no capacitance. An inductivity and an appropriate resistance can be selected.

Figure 10:
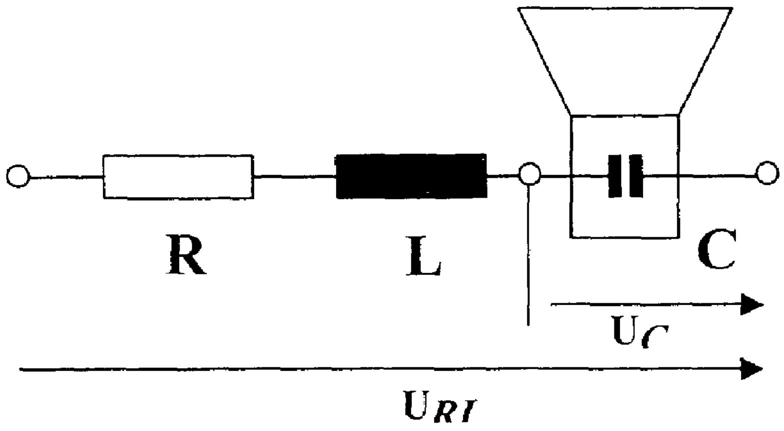
FIG. 10 shows a RLC-network of a resonance point to be produced at a transducer.

FIG. 10 shows an RLC-network, wherein the capacitance is produced by the transducer. Modifications of the illustrative network are possible, are however herein not described in greater detail.

Figure 11:
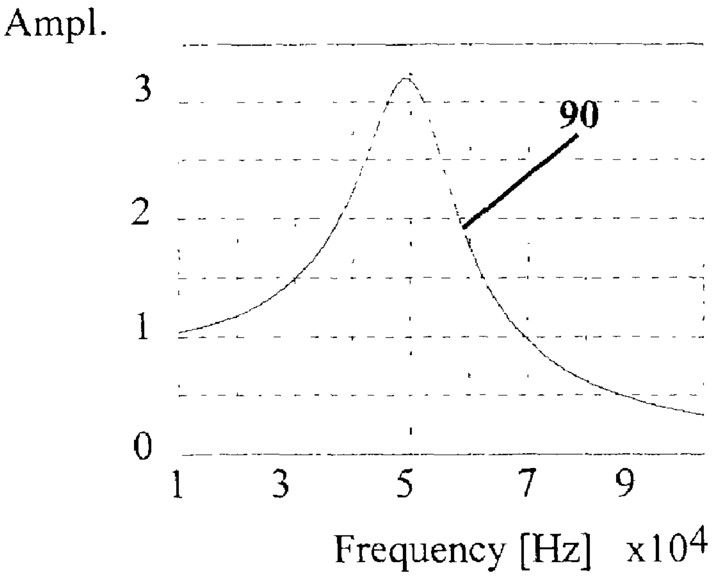
FIG. 11 shows a characteristic line of the network represented in FIG. 8.

For the network in FIG. 10, FIG. 11 shows the amplitude voltage $U_c$ resulting at the transducer input (with reference to the overall output voltage $U_{RLC}$). With the selected values: C=1nF; L=10 mH; R=1 kΩ there results a resonance point at for example 50 kHz. The described RCL-network shows to a certain degree a schematic substitute circuit diagram of a resonant transducer. When the transducer is for example only capacitative, then the desired resonance characteristic line 90 can be produced by the corresponding solution of R and L. Besides the exemplary shown RLC-network it is possible to also use other networks which are herein generally referred to as resonant filter networks.

It is particularly advantageous, that it is also possible with broad band transducers, in connection with an RLC-network, that multi-path systems can be constructed and be controlled or driven by FM-signals. Therefrom, there result the same conforming or adaptive advantages as with the resonant transducers.

An embedding of the transducer in a resonant filter network has the further advantage, that at the transducer itself a higher voltage can result than indicated by the amplifier. Thereby it becomes possible to drive transducers which require a high input voltage with low amplifier circuit expense or complexity. In the example in FIG. 11 a voltage amplification of approximately 3 is achieved by the RLC-network. This would mean, when the transducer is designed for a voltage of for example 1000 volt, that the amplifier need merely be designed for 330 volt. Thereby a significantly simpler circuit construction is possible.

Depending upon the respective application in the framework within which the inventive parametric loudspeaker is to be employed, it is conceivable that the input signal which is supplied to the modulator is a warning signal and/or an information signal and/or a noise signal (for example for active noise suppression) and/or a speech signal (for example an interactive voice dialog) and/or a music signal.

What is claimed is:

1. A process for controlling a parametric loudspeaker system, comprising:

driving one or more resonant transducer elements for ultrasound to produce an AM-signal, which during propagation in a gaseous medium produces an audible signal by self demodulation, providing one or more amplifiers associated with these transducer elements, and providing one or more modulators associated therewith, which receive an input signal from a signal source, wherein the transducer elements are driven with an FM-modulated signal (FM-modulation) only in the area of the slope of their resonant characteristic lines.

2. The process according to claim 1, wherein in the case that the transducer elements exhibit no significant resonance characteristic line, the resonance characteristic line is produced by the mixing of the transducer element with a resonant filter network, in the manner, that the filter network inclusive of the transducer element produces a resonance slope or so modifies existing slopes of the characteristic line of the transducer element, as are necessary for the satisfactory conversion of the FM-modulation into an AM-modulation by the transducer element.

3. The process according to claim 1, wherein the slope of the resonant characteristic line is modified by a unit for modification of the characteristic line connected upstream of the modulator, to the extent that the total characteristic fine resulting from this change influences the translation of the FM-modulated signal into the AM-signal emitted by the transducer element, in that the unit for modification of the characteristic line produces a voltage/voltage-translation.

4. The process according to claim 3, wherein the unit for modification of the characteristic line compensates for irregularities in the characteristic line of the transducer element, whereby a total characteristic line results comprised of one or more flattened out curve segments.

5. The process according to claim 3, wherein the unit for modification of the characteristic line is used to linearize the FM/AM translation occurring in the transducer, whereby in the resulting total characteristic line an ideal AM-modulation results.

6. The process according to claim 1, wherein the modulation depth of the driver is adjustable, in that the smallest output voltage arriving at the transducer can be preset.

7. The process according to claim 1, wherein the input signal which is supplied to the modulators is a warning signal and/or an information signal and/or a noise signal and/or a voice signal and/or a music signal.

8. The process according to claim 1, wherein the one or more transducer elements include a total set of transducer elements and for adjusting a parametric multi-path loudspeaker system the total set of transducer elements is subdivided into groups, wherein each group is controlled by at least one associated FM-modulator.

9. The process according to claim 8, wherein the one or more modulators include individual FM-modulators and the individual FM-modulators are respectively supplied with one signal front a multi-path separation of the input signal, wherein in the multi-path separation a frequency-based band separation of the input signal of the modulator is undertaken.

10. The process according to claim 8, wherein in the case that the transducer elements which are subdivided into multiple groups respectively group-wise exhibit different characteristic lines, these groups respectively utilize different FM-modulators.

11. The process according to claim 8, wherein as a result of the selected frequency range a power adaptation to the transducer elements occurs, in the manner, that the selection of the transducer elements of a group of transducer elements is matched to the power required for its associated frequency band.

12. The process according to claim 8, wherein for each individual of the group of transducer elements the respective directionality of the loudspeaker system is optimized, in that the selection of the transducer elements of a group of transducer elements occurs on the basis of the directionality of the individual transducer elements in the respective frequency band.

13. The process according to claim 8, wherein for each individual of the group of transducer elements the respective directional effect of the loudspeaker system is optimized, in that the individual groups of transducer elements, in particular depending upon the frequency band of the input signal of the modulator associated with them, are arranged differently geometrically.

14. A device for controlling a parametric loudspeaker system, comprising:

one or more resonant transducer elements for ultrasound, which can be driven to produce an AM-signal, which during propagation in a gaseous medium produces an audible signal by self demodulation, one or more amplifiers associated with these transducer elements, and one or more modulators associated therewith, which receive an input signal from a signal source, wherein means are provided for driving the transducer elements with an FM-modulated signal (FM-modulation) only in the area of the slope of their resonant characteristic lines.

15. The device according to claim 14, wherein in the case that the transducer elements exhibit no significant resonance characteristic line, a filter network is provided, which includes the transducer element and thereby produces a resonance slope as necessary for the satisfactory conversion of the FM-modulation into an AM-modulation by the transducer element.

16. The device according to claim 14, wherein a unit is connected upstream for modification of the modulator, whereby the slope of the resonant characteristic line is modified, to the extent that the total characteristic line resulting from this change influences the translation of the FM-modulated signal into the AM-signal emitted by the transducer element, in that the unit for modification of the characteristic line produces a voltage/voltage-translation.

17. The device according to claim 16, wherein the unit for modification of the characteristic line compensates for irregularities in the characteristic line of the transducer element, whereby a total characteristic line results comprised of one or more flattened out curve segments.

18. The device according to claim 16, wherein the unit for modification of the characteristic line is adapted to linearize the FM/AM translation occurring in the transducer element, whereby in the resulting total characteristic line an ideal AM-modulation results.

19. The device according to claim 16, wherein a means is provided for adjusting the modulation depth of the driver, in that the smallest output voltage arriving at the transducer element can be preset.

20. The device according to claim 16, wherein the one or more transducer elements include a total set of transducer elements and for adjusting a parametric multi-path loudspeaker system the total set of transducer elements is subdivided into groups, wherein each group is controlled by at least one associated FM-modulator.

21. The device according to claim 20, whereby means are provided for multi-path separation of the input signal, wherein in the multi-path separation a frequency-based band separation of the input signal of the modulator is undertaken.

22. The device according to claim 20, wherein in the case that the transducer elements which are subdivided into multiple groups respectively group-wise exhibit different characteristic lines, these groups are respectively provided with different FM-modulators.

23. The device according to claim 20, wherein as a result of the selected frequency range a power adaptation to the transducer elements occurs, in the manner, that the selection of the transducer elements of a group of transducer elements is matched to the power required for its associated frequency band.

24. The device according to claim 20, wherein for each individual of the group of transducer elements the respective directionality of the loudspeaker system is optimized, in that the selection of the a transducer elements of a group of transducer elements occurs on the basis of the directionality of the individual transducers in the respective frequency band.

25. The device according to claim 20, wherein for each individual of the group of transducer elements the respective directional effect of the loudspeaker system is optimized, in that the individual groups of transducer elements, in particular depending upon the frequency band of the input signal of the modulator associated with them, are arranged differently geometrically.

26. The device according to claim 20, wherein the transducer elements are so arranged, that the transducer elements which are associated with the lower frequencies of the input signal are positioned at the outer area of the device and that the transducer elements which are associated with the high frequencies of the input signal are positioned at the inner area of the device.

27. The device according to claim 20, wherein the transducer elements which are associated with the high frequencies of the input signal are tightly clustered and that the transducer elements which are associated with the lower frequencies of the input signal are relatively more spread out.

28. A process for controlling a parametric loudspeaker system, comprising:

modulating an input signal received from a signal source by at least one FM-modulator having a modulator characteristic line;

providing at least one transducer element for ultrasound, the transducer element being capable of producing an AM-signal which during propagation in a gaseous medium produces an audible signal by self demodulation, the transducer dement having a transducer characteristic line that cooperates with the modulator characteristic line to result in a 1:1 translation of flue input signal; and providing at lease one amplifier associated with the transducer element, wherein the transducer elements are driven with an FM-modulated signal (FM-modulation) only in the area of the slope of their resonant characteristic lines.

29. A device for controlling a parametric loudspeaker system, comprising:

at least one FM-modulator having a modulator characteristic line for modulating an input signal received from a signal source;

at least one transducer element for ultrasound, the transducer element being capable of producing an AM-signal which during propagation in a gaseous medium produces an audible signal by self demodulation, the transducer element having a transducer characteristic line that cooperates with the modulator characteristic line to result in a 1:1 translation of the input signal; and at lease one amplifier associated with the transducer element, wherein the transducer elements are driven with an FM-modulated signal (FM-modulation) only in the area of the slope of their resonant characteristic lines.

* * * * *